(12) United States Patent
Fromont et al.

(10) Patent No.: US 11,001,279 B2
(45) Date of Patent: May 11, 2021

(54) RAILROAD VEHICLE WITH FIRE RETARDANT ANTI-VIBRATION DEVICE

(71) Applicant: HUTCHINSON, Paris (FR)

(72) Inventors: Yann Fromont, Pontoise (FR); Nordine Addes, Les Authieux (FR); Stephane Avoinet, Asnieres sur Seine (FR); Pierre-Emmanuel Gautheret, Le Mesnil Esnard (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 15/461,525

(22) Filed: Mar. 17, 2017

(65) Prior Publication Data

US 2017/0267260 A1 Sep. 21, 2017

(30) Foreign Application Priority Data

Mar. 18, 2016 (FR) ...................... 1652335

(51) Int. Cl.
| | |
|---|---|
| *B61F 5/30* | (2006.01) |
| *B61F 5/50* | (2006.01) |
| *F16F 1/40* | (2006.01) |
| *F16F 1/387* | (2006.01) |
| *C08K 5/02* | (2006.01) |

(Continued)

(52) U.S. Cl.
CPC .............. *B61F 5/305* (2013.01); *B61F 5/50* (2013.01); *C08K 3/04* (2013.01); *C08K 3/2279* (2013.01); *C08K 5/02* (2013.01); *C09D 111/00* (2013.01); *F16F 1/3876* (2013.01); *F16F 1/3935* (2013.01); *F16F 1/40* (2013.01); *C08K 2003/2224* (2013.01); *C08K 2003/2227* (2013.01); *C08K 2003/2296* (2013.01); *C09K 21/02* (2013.01); *C09K 21/06* (2013.01); *C09K 21/08* (2013.01); *F16F 2224/02* (2013.01);

(Continued)

(58) Field of Classification Search
CPC .......... F16F 1/38; F16F 1/3835; F16F 1/3842; F16F 1/3876; F16F 1/3935; F16F 2224/025; F16F 2230/0023; F16F 2230/48; C08K 3/016
USPC ........................................ 267/140.4
See application file for complete search history.

(56) References Cited

U.S. PATENT DOCUMENTS

| | | | | |
|---|---|---|---|---|
| 3,391,100 A | * | 7/1968 | Mitchell, Jr. | .......... C09J 111/00 523/220 |
| 5,011,163 A | * | 4/1991 | Hermann | ................ E06B 5/164 277/645 |

(Continued)

FOREIGN PATENT DOCUMENTS

| | | |
|---|---|---|
| AU | 2010201675 | 12/2010 |
| AU | 2013/299319 | 2/2015 |

(Continued)

*Primary Examiner* — Thomas J Williams
(74) *Attorney, Agent, or Firm* — Clark & Brody LP

(57) ABSTRACT

The invention relates to an anti-vibration device (100), for example intended for a railroad application, comprising:
- a first frame (10),
- a second frame (20),
- a shock absorbing structure (30) for the vibrations, situated between the two frames (10, 20), and
- at least one fire barrier layer (40) at least partially covering the shock absorbing structure (30);

characterized in that said at least one fire barrier layer (40) is a polychloroprene-based elastomer including at least one fire retardance agent chosen from among alumina trihydrate or magnesium hydroxide.

13 Claims, 1 Drawing Sheet

(51) Int. Cl.
*C08K 3/04* (2006.01)
*C09D 111/00* (2006.01)
*C08K 3/22* (2006.01)
*F16F 1/393* (2006.01)
*C09K 21/02* (2006.01)
*C09K 21/06* (2006.01)
*C09K 21/08* (2006.01)

(52) U.S. Cl.
CPC . *F16F 2230/0023* (2013.01); *F16F 2230/105* (2013.01)

(56) References Cited

U.S. PATENT DOCUMENTS

| | | | | |
|---|---|---|---|---|
| 5,271,678 | A * | 12/1993 | Bourgeot | B61D 3/10 |
| | | | | 105/3 |
| 8,653,371 | B2 * | 2/2014 | Kibe | H01B 7/2806 |
| | | | | 174/110 PM |
| 2008/0090057 | A1 | 4/2008 | Suzuki et al. | |
| 2010/0183856 | A1 * | 7/2010 | Kind | C08J 7/04 |
| | | | | 428/212 |
| 2012/0135221 | A1 | 5/2012 | Weidinger et al. | |
| 2014/0329035 | A1 * | 11/2014 | Tsunenishi | C08L 11/00 |
| | | | | 428/34.4 |
| 2015/0203693 | A1 * | 7/2015 | Mestan | C09D 7/48 |
| | | | | 428/195.1 |
| 2017/0307042 | A1 * | 10/2017 | Zander | F16F 9/0409 |
| 2018/0051157 | A1 | 2/2018 | Mestan | |

FOREIGN PATENT DOCUMENTS

| | | | | |
|---|---|---|---|---|
| AU | 2015215919 | | 4/2016 | |
| AU | 2014/339347 | | 6/2016 | |
| CA | 2 764 688 | | 12/2010 | |
| CN | 103387699 | | 11/2013 | |
| CN | 103707579 | | 4/2014 | |
| CN | 104861240 | | 8/2015 | |
| DE | 19642355 | | 4/1998 | |
| DE | 10 2013 01757 | | 4/2015 | |
| DE | 102016104496 | A1 * | 9/2016 | ............ B60G 11/22 |
| EP | 2 107 081 | | 10/2009 | |
| EP | 2 196 492 | | 6/2010 | |
| EP | 2 455 221 | | 5/2012 | |
| JP | 2007-023102 | | 2/2007 | |
| KR | 2006-0011121 | | 2/2006 | |
| WO | 91/01348 | | 2/1991 | |
| WO | 94/021748 | | 9/1994 | |

* cited by examiner

RAILROAD VEHICLE WITH FIRE RETARDANT ANTI-VIBRATION DEVICE

The invention relates to a fire-resistant anti-vibration device, intended for a railroad application.

The railroad application in particular relates to trains, trams or subways.

Document EP 2,196,492 proposes a fire-resistant anti-vibration device, in particular intended for a railroad application, including two frames, a shock absorbing structure situated between the two frames and a fire barrier layer at least partially covering the shock absorbing structure. The shock absorbing structure is made from elastomer. The fire barrier layer includes a bonding agent, for example an elastomer, and a flame retardance agent.

The applicable standards in terms of fire resistance are increasingly demanding, in particular in the railroad field. Thus, in the railroad field, standard EN 45545-2 (2013) is henceforth the reference.

One aim of the invention is to propose an anti-vibration device having improved fire resistance, in particular able to satisfy the aforementioned standard.

To that end, the invention proposes an anti-vibration device intended for a railroad application, comprising:
a first frame,
a second frame,
a shock absorbing structure for the vibrations, situated between the two frames, and
at least one fire barrier layer at least partially covering the shock absorbing structure; characterized in that said at least one fire barrier layer is a polychloroprene-based elastomer including at least one fire retardance agent chosen from among alumina trihydrate or magnesium hydroxide.

The device may also have at least one of the following features, considered alone or in combination:
the polychloroprene base represents between 80 parts and 100 parts of the elastomer forming this fire barrier layer, for 100 parts of the elastomer forming this fire barrier layer, and the alumina trihydrate or magnesium hydroxide represents between 10 and 300 parts;
the fire barrier layer includes a curing agent chosen from among: zinc oxide (ZnO), diarylparaphenylenediamine, magnesium oxide (MgO), or made from a mixture thereof;
the fire barrier layer comprises an adhesion agent between the fire barrier layer and the shock absorbing structure, namely Triallyl isocyanurate and/or dicumyl peroxide;
the or each adhesion agent represents at most 20 parts;
the fire barrier layer includes at least one implementing agent, for example Bis(Pentabromophenyl)ethane, stearic acid, chlorinated paraffin or a mixture thereof;
the fire barrier layer includes at least one mechanical strengthening agent, for example carbon black and/or antimony trioxide;
the fire barrier layer has a thickness of at least 0.5 mm;
the fire barrier layer comprises at least one other elastomer, for example an elastomer making it possible to improve the implementation, the mechanical properties or the gas impermeability of the polychloroprene;
the first frame forms an inner frame, the second frame forms an outer frame, and the vibration shock absorbing structure assumes the form of a laminate with an elastomer layer/layer of a non-elastomer material more rigid than the elastomer, for example metal, and including a first face fixed to the inner frame, a second face fixed to the outer frame, a third face extending between the inner frame and the outer frame, and a fourth face, opposite the third face and also extending between the inner frame and the outer frame, said third and fourth faces therefore being faces not fastened to the inner and outer frames, the fire barrier layer also being situated on at least one of the faces not connected to the inner and outer frames.

The invention will be better understood and other aims, advantages and features thereof will appear more clearly upon reading the following description, done in light of the following appended figures.

Figure 1:
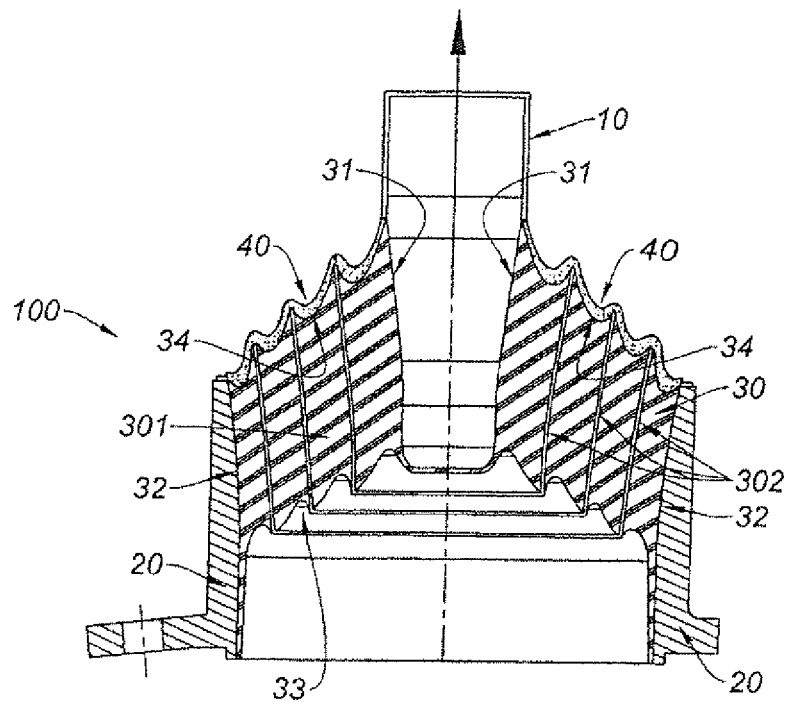
FIG. 1 shows a sectional view of an example anti-vibration device according to the invention.
Figure 2:
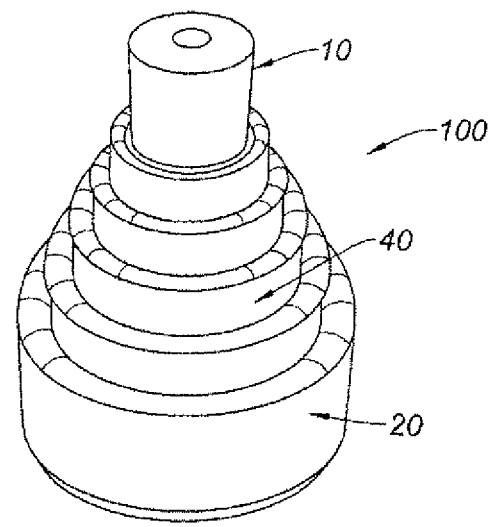
FIG. 2 shows a perspective view the anti-vibration device of FIG. 1.

The following description is done in reference to the appended FIGS. 1 and 2, which show an anti-vibration device used for a railroad application. In the case at hand, this is a primary suspension intended to be installed on a train bogie.

That said, it should be noted that the following description could also pertain, for this railroad application, to a secondary suspension like that which is shown in document EP 2,196,492, an elastic articulation, in particular of the pivot, elastic rod or bush bearing type, or an elastic wheel (tram, subway).

The anti-vibration device 100 according to the invention comprises a first frame 10, a second frame 20 and a vibration shock absorbing structure 30 situated between the two frames 10, 20.

In the case at hand, the first frame 10 forms an inner frame and the second frame 20 forms an outer frame, and the vibration shock absorbing structure 30 assumes the form of a laminate with a layer of elastomer 301/layer of a non-elastomer material 302 (in the case at hand, metal) more rigid than the elastomer extending between the two frames 10, 20. More specifically, in the case at hand, the vibration shock absorbing structure 30 includes a first face 31 fastened to the inner frame 10, a second face 32 fastened to the outer frame 20, a third face 33 extending between the inner frame 10 and the outer frame 20, and a fourth face 34, opposite the third face 33 and also extending between the inner frame 10 and the outer frame 20. It will be understood that the faces 33, 34 are not fastened to any of the inner or outer frames.

The anti-vibration device 100 also comprises at least one fire barrier layer 40 at least partially covering the shock absorbing structure 30. In the case at hand, the fire barrier layer 40 covers the fourth face 34 of the vibration shock absorbing structure 30, which is the surface intended to be most exposed, during use, to a potential problem.

The fire barrier layer 40 is a polychloroprene-based elastomer including at least one fire retardance agent, in the case at hand alumina trihydrate.

The thickness of the fire barrier layer 40 will advantageously be at least 0.5 mm, and typically about 2 mm. Advantageously, this thickness will nevertheless be comprised between 0.5 mm and several mm, in particular between 0.5 mm and 10 mm or between 0.5 mm and 5 mm. More generally, this thickness may be comprised between 0.5 mm and several centimeters, and in particular between 0.5 mm and 3 cm. A minimum value of 0.5 mm is in fact advantageous to maintain a minimum mechanical resistance of the fire barrier layer 40, in particular during the manufacturing of the device. Furthermore, it is not easy, during this manufacturing, to perform adequate roller leveling of a fire barrier layer measuring less than 0.5 mm. The fire barrier layer 40 does not participate in the shock absorbing function, and therefore anti-vibration function, of the anti-vibration device that is provided by the shock absorbing structure 30.

Table 1 shows an example chemical composition of the fire barrier layer 40 that can be used with the anti-vibration device 100 of FIGS. 1 and 2.

TABLE 1

| Category | Chemical nature | Function | Quantity (pce) |
| --- | --- | --- | --- |
| Elastomer | Polychloroprene | Mechanical strength and fire resistance | 100 |
| Plasticizer | Bis(Pentabromophenyl)ethane | Implementation | 4 |
| | Stearic acid | Implementation | 1 |
| | Chlorinated paraffin | Implementation | 14 |
| Filler | Alumina trihydrate (specific surface 15 m²/g) | Flame retardance | 70 |
| | Carbon black | Mechanical reinforcement | 18 |
| | Antimony trioxide | Mechanical reinforcement | 8 |
| Curing agent | Zinc oxide | Curing | 5 |
| | Diarylparaphenylenediamine | Curing | 1.5 |
| | Magnesium oxide | Curing | 4 |
| Adhesion agent | Triallyl isocyanurate (TAIC) | Adhesion | 2 |
| | Dicumyl peroxide | Adhesion | 5 |

Dupont™ Neopren GW is one example of polychloroprene that may be used.

L'Apyral® 200SM is one example of alumina trihydrate with a specific surface of 15 m²/g that may be used. Indeed, alumina trihydrate assumes the form of a powder before manufacturing of the fire barrier layer. It should be noted that there are several grades of alumina trihydrate, these grades differing from one another by their specific surfaces. The larger the specific surface is, the greater the flame retardance effect will be.

In table 1, the quantities of each product are provided in pce, i.e., in parts. As in any elastomer formulation, one first defines 100 parts elastomer, in the case at hand in this table 1, 100 parts polychloroprene. One then defines the other parts based on these 100 elastomer parts.

The essential products to achieve the aim of the invention are polychloroprene (elastomer) and alumina trihydrate ($Al_2O_3$-$3H_2O$), the latter being a flame retardance agent.

Thus, aside from the specific composition provided in table 1, it will therefore be possible to provide a fire barrier layer 40 only including polychloroprene and alumina trihydrate (ATH). In this case, for 100 parts (pce) polychloroprene, one will provide between 10 and 300 parts (pce) alumina trihydrate.

If one provides a thickness of 0.5 mm for the fire barrier layer 40, then it is advantageously appropriate to provide, for 100 parts polychloroprene, at least 200 parts alumina trihydrate. This makes it possible to ensure fire resistance, in particular according to the aforementioned standard.

When the thickness of the fire barrier layer 40 increases, it is possible to consider providing, for 100 parts polychloroprene, fewer than 200 parts (but still more than 10) alumina trihydrate to ensure fire resistance, in particular according to the aforementioned standard. For example, for a thickness of the fire barrier layer 40 of 1.5 mm, it is advantageously appropriate to provide at least 70 parts alumina trihydrate for 100 parts polychloroprene. According to another example, for a thickness of 10 mm for the fire barrier layer 40, it is advantageously appropriate to provide at least 20 parts alumina trihydrate for 100 parts polychloroprene. Lastly, according to still another example, for a thickness of 2 cm, or even more, of the fire barrier layer 40, it is possible to consider 10 parts alumina trihydrate for 100 parts polychloroprene.

It should be noted that the alumina trihydrate can be replaced by magnesium hydroxide as flame retardance agent. In this case, the basic chemical composition of the fire barrier layer 40 provides polychloroprene and magnesium hydroxide, using proportions (pce) identical to those of the polychloroprene and alumina trihydrate. Thus, for 100 parts (pce) polychloroprene, one will provide between 10 and 300 parts (pce) magnesium hydroxide. Here again, as the thickness of the fire barrier layer 40 increases, the minimum portion of magnesium hydroxide, for 100 parts (pce) polychloroprene, is adjustable as previously described for alumina trihydrate, qualitatively and quantitatively.

The composition of the fire barrier layer 40 provided in table 1 has been tested according to standard EN 45545-2, applicable to the railroad field.

This standard proposes different tests to be passed, the tests in question in particular depending on the nature of the anti-vibration device (for example, elastomer/metal or not, elastomer mass) and the usage environment (for example, depending on whether the train is a sleeper train, a subway, etc.).

The anti-vibration device 100 shown in FIGS. 1 and 2 is an elastomer/metal piece in the case at hand. In this case, the standard indicates that reference should be made to criteria R9, R22, R23 and/or R24. Each criterion proposes a series of tests, each test having to be carried out according to an ISO standard.

Among these various criteria, the most difficult to achieve is the R9 criterion, which includes two tests to be conducted, the first according to standard ISO 5660-1 (ignitability and heat release rate with determination of the MAHRE at 25 kW/m²), the second according to standard ISO 5659-2 (smoke opacity with determination of Ds(max) at 25 kW/m² with pilot flame plus, at the same time, toxicity of the smoke at 25 kW/m² with pilot flame and determination of the $CIT_G$ at 4 mn and 8 mn).

Furthermore, taking the usage environment of the anti-vibration device into account is established for each criterion and each ISO test affected by this criterion, based on limit values that are more or less difficult to achieve, according to a classification from HL1 (least restrictive) to HL3 (most restrictive: in particular, sleeper trains or subways, which travel in tunnels).

This is why the composition of table 1 has been tested according to the R9 criterion of standard EN 45545-2, this criterion being the most difficult to achieve for an anti-vibration device like that shown in FIGS. 1 and 2.

To comply with the standard according to this R9 criterion, the various tests should be carried out on an elastomer plate measuring 20 mm thick, 100 mm*100 mm (Test 1 of table 2) or 75 mm*75 mm (test 2 of table 2) in the other dimensions, and the composition of which is that which is intended to form the vibration shock absorbing structure 30. Cladding is added on the surface of the plate, this cladding being intended to represent the fire barrier layer 40.

For more precisions on the performance of the different tests, reference can be made to standard EN 45545-2.

Table 2 below provides, for the different tests of the R9 criterion, the results obtained for a "reference I" (plate made from natural rubber measuring 20 mm thick, with no anti-fire cladding), a "reference II" (plate made from natural rubber measuring 18 mm thick, with cladding, the composition of which is that of table 1, but without alumina trihydrate, measuring 2 mm thick), and the results obtained for the "invention" (plate made from natural rubber measuring 18 mm thick with cladding, the composition of which is that of table 1, measuring 2 mm thick).

For "reference I", "reference II" and the "invention", the plates have identical dimensions in the directions other than the thickness. Table 2 also recalls that according to the R9 criterion (the most difficult to achieve from among the R9, R22, R23 and R24 criteria), sub-criterion HL2 (medium constraint among the sub-criteria HL1, HL2 and HL3, but which generally covers more than 90% of the market) should be achieved.

TABLE 2 criterion R9, HL2 of standard EN45545-2

| | Test 1: ISO 5660-1 | Test 2: ISO 5659-2 | |
|---|---|---|---|
| | MAHRE (kW/m$^2$) | $D_s$ (max) | ITCG (toxicity) |
| criterion R9, HL2 | <90 | <600 | <1.8 |
| Reference I | 160 | 792 | 0.14 |
| Reference II | 85 | 792 | 0.5 |
| Invention | 79.4 | 95.8 | 0.53 |

As can be seen in table 2, neither reference I nor reference II complies with the standard. By comparing reference II to reference I, one can see that the MAHRE is significantly improved, as is the toxicity. This is related to the presence of the polychloroprene. However, reference II does not make it possible to achieve the $D_S$(max) criterion.

On the contrary, the invention indeed passes the standard according to the R9 criterion, HL2 sub-criterion. Furthermore, by comparing the invention to reference II, one can see that the presence of alumina trihydrate, in addition to polychloroprene, significantly improves the $D_S$(max) and also improves the MAHRE. The improvement to the $D_S$(max) can be attributed to the presence of alumina trihydrate. Regarding the MAHRE, a synergistic effect is noted between the polychloroprene and the alumina trihydrate.

It should be noted that if one wishes to achieve the HL3 sub-criterion, it is possible to increase the thickness of the cladding, which is representative, according to the standard, of the thickness of the fire barrier layer 40, beyond 2 mm while keeping the composition of table 1. It is also alternatively possible to keep this thickness of 2 mm and increase the alumina trihydrate parts. According to another alternative, it is also possible to increase both the thickness of the cladding and the alumina trihydrate parts. Advantageously, one will, however, take advantage of the synergistic effects between the polychloroprene and the alumina trihydrate, in particular on the MAHRE, by increasing the alumina trihydrate parts without modifying the cladding thickness, or even reducing it. This makes it possible to define a fire barrier layer 40 satisfying the requirements and that is also not too cumbersome.

Regarding the chemical composition of the fire barrier layer 40, it is more generally possible to provide, as indicated in table 3, the following parts (pce):

TABLE 3

| Category | Chemical nature | Quantity (pce) |
|---|---|---|
| Elastomer | Polychloroprene | 80 to 100 |
| | Other elastomer | 0 to 20 |
| Plasticizer | Bis(Pentabromophenyl)ethane | 0 to 50 |
| | Stearic acid | 0 to 5 |
| | Chlorinated paraffin | 0 to 50 |
| Filler | Alumina trihydrate | 10 to 300 |
| | Carbon black | 0 to 200 |

TABLE 3-continued

| Category | Chemical nature | Quantity (pce) |
|---|---|---|
| | Antimony trioxide | 0 to 50 |
| Curing agent | Zinc oxide | 0 to 50 |
| | Diarylparaphenylenediamine | 0 to 10 |
| | Magnesium oxide | 0 to 50 |
| Adhesion agent | Triallyl isocyanurate (TAIC) | 0 to 20 |
| | Dicumyl peroxide | 0 to 20 |

As a reminder, the composition of the elastomer making up the fire barrier layer 40 is still defined with 100 parts. The base of this elastomer making up the fire barrier layer 40 is polychloroprene (CR), with at least 80 parts (i.e., between 80 and 100 parts elastomer forming the fire barrier layer 40), and, as shown in table 3, another elastomer filling in the rest to arrive at the total of 100 parts, can be considered to perform certain functions.

For example, this other elastomer can be an additional implementing agent (facilitates the mixing of different components during the manufacturing of the fire barrier layer 40) representing a maximum of 20 parts (the polychloroprene then consequently representing at least 80 parts).

According to another example, this other elastomer can improve the mechanical properties of the fire barrier layer 40. In this case, it is in particular possible to consider natural rubber (NR) representing no more than 5 parts (the polychloroprene then consequently representing at least 95 parts).

According to a final example, this other elastomer can make it possible to improve the gas impermeability of the polychloroprene. In this case, it is in particular possible to consider a butyl (known under the acronym IR, standing for "Isobutylene Isoprene Rubber"), representing no more than 10 parts or no more than 5 parts.

The maximum parts of this other elastomer, irrespective of its function, are determined, for the given examples, so that the polychloroprene-based elastomer maintains its fire resistance properties, in particular in light of the aforementioned standard.

Of course, it is possible to consider several other elastomers, in addition to the polychloroprene base, for example a mixture of other aforementioned elastomers.

It should be noted that the alumina trihydrate used in the fire barrier layer 40 advantageously has a specific surface (m$^2$/g) of at least 15 m$^2$/g (powder). This is the case for the product known under the commercial name Apyral® 200 SM. Nevertheless, it is possible to consider using an alumina trihydrate with a specific surface of at least 10 m$^2$/g (for example, Apyral® 120E, which has a specific surface of 11 m$^2$/g), or even at least 5 m$^2$/g (for example, Apyral® 60D, which has a specific surface of 6 m$^2$/g). Irrespective of the considered grade, it will be possible, for 100 parts elastomer, always to provide between 10 parts and 300 parts alumina trihydrate. However, for a grade having a smaller specific surface, more alumina trihydrate parts should be provided. As an example, if, for 100 parts elastomer, one provides 95 parts Apyral® 200SM, an equivalent in terms of expected results corresponds, still for 100 parts elastomer, to 120 parts Apyral® 60D.

As shown by table 3, the fire barrier layer 40 may include at least one curing agent chosen from among: zinc oxide (ZnO), diarylparaphenylenediamine, magnesium oxide, or made from a mixture thereof. Furthermore, in the tested case of table 1, the fire barrier layer 40 includes a mixture of all of these chemical compounds. This makes it possible, during manufacturing, to ensure the curing of the fire barrier layer 40.

Furthermore, still supported by FIG. 3, it will be noted that the fire barrier layer 40 may comprise at least one adhesion agent between the polychloroprene (fire barrier layer 40) and the natural rubber (shock absorbing structure 30), namely Triallyl isocyanurate (TAIC) and/or dicumyl peroxide.

This or each of these adhesion agents can also provide adhesion with types of elastomer other than natural rubber. It is thus completely possible to consider, as non-limiting examples, butadiene (BR), butadiene nitride (NBR) or butadiene styrene (SBR). This adhesion, which is then a chemical adhesion between the fire barrier layer 40 and the shock absorbing structure 30, is advantageous because it makes it possible to ensure that the barrier layer covers the shock absorbing structure 30 under all usage conditions.

Nevertheless, in the absence of an adhesion agent in the fire barrier layer 40, it is possible to provide other means, such as an appropriate glue, between the fire barrier layer 40 and the shock absorbing structure 30.

In some cases, in particular when the anti-vibration device has a certain symmetry (which is the case in FIGS. 1 and 2) and still in the absence of such an adhesion agent, it is possible to settle for elastic properties of the fire barrier layer 40, properties making it possible to maintain this fire barrier layer 40 against the shock absorbing structure 30 sufficiently (the fire barrier layer 40 then assuming the form of a "sock" covering the circumference of the shock absorbing structure 30). Likewise, the fire barrier layer 40 may include at least one implementing agent, i.e., Bis(Pentabromophenyl)ethane, stearic acid and/or chlorinated paraffin. An implementing agent facilitates the mixing between the different components during the manufacturing of the elastomer intended to form the fire barrier layer 40.

Lastly, and traditionally, the fire barrier layer 40 may include at least one mechanical strengthening agent, namely carbon black and/or antimony trioxide.

The anti-vibration device 100 according to the invention of table 1 and as shown in FIGS. 1 and 2 can be manufactured as follows.

First of all, a plate measuring 2 mm thick is calendared, with the chemical composition defined in table 1.

Next, this plate is cut into the form of a ring portion (this shape is chosen because it makes it possible to obtain a cone once it is given a three-dimensional shape).

This plate, with two frames and a set of metal pieces (intended to form the rigid layers of the elastomer/metal laminate of the shock absorbing structure 30), is then placed in a mold. It should be noted that the mold is completely traditional in itself and is therefore a mold typically used to form an anti-vibration device having no fire barrier layer.

Natural rubber is then injected into the mold (this rubber being intended to form the elastomer of the elastomer/metal laminate of the shock absorbing structure 30).

The curing is done, for example at 160° for 15 min. During this curing step, the elastomer of the fire barrier layer 40 bonds closely to the elastomer (here, natural rubber) of the shock absorbing structure 30.

One then obtains a fire barrier layer 40 that is perfectly integrated into the anti-vibration device 100, with very limited, or even nonexistent, risks of delamination of the elastomer from the shock absorbing structure.

Of course, it will be understood that this manufacturing method, described for the specific case of the fire barrier layer whose chemical composition is provided in table 1 to obtain an anti-vibration device 100 as illustrated in FIGS. 1 and 2, can be generalized to other anti-vibration devices, in particular including a fire barrier layer as defined in table 3 or in which the alumina trihydrate is replaced with magnesium hydroxide and/or not forming a primary suspension.

Furthermore, before calendaring the fire barrier layer, it will be understood that this layer should be chemically formulated. This operation is traditional and is therefore not described in more detail. It is, however, at this stage that the grade (specific surface) of the alumina trihydrate powder to be used should be chosen. A similar remark can be made when different grades of magnesium hydroxide are available.

The invention claimed is:

1. An anti-vibration device (100), the anti-vibration device comprising:
   a first frame (10),
   a second frame (20),
   a shock absorbing structure (30) for the vibrations, situated between the first and second frames (10, 20), and
   at least one fire barrier layer (40) at least partially covering the shock absorbing structure (30);
   wherein said at least one fire barrier layer (40), of thickness comprised between 05 mm and 3 cm, is a polychloroprene-based elastomer including at least one fire retardance agent chosen from among alumina trihydrate or magnesium hydroxide, the polychloroprene base represents between 80 parts and 100 parts of the polychloroprene-based elastomer forming the at least one fire barrier (40), and for 100 parts of the elastomer forming the at least one fire barrier, the aluminum trihydrate or magnesium hydroxide represents between 10 and 300 parts, and wherein the at least one fire retardance agent has a specific surface of at least 5 $m^2/g$.

2. The anti-vibration device according to claim 1, wherein the fire barrier layer (40) includes a curing agent chosen from among: zinc oxide (ZnO), diarylparaphenylenediamine, magnesium oxide (MgO), or made from a mixture thereof.

3. The anti-vibration device according to claim 1, wherein the fire barrier layer (40) comprises a chemical adhesion agent between the fire barrier layer (40) and the shock absorbing structure (30).

4. The anti-vibration device according to claim 3, wherein the chemical adhesion agent represents at most 20 parts.

5. The anti-vibration device according to claim 1, wherein the fire barrier layer (40) includes at least one implementing agent, for example Bis(Pentabromophenyl)ethane, stearic acid, chlorinated paraffin or a mixture thereof.

6. The anti-vibration device according to claim 1, wherein the fire barrier layer (40) includes at least one mechanical strengthening agent, for example carbon black and/or antimony trioxide.

7. The anti-vibration device according to claim 1, wherein the fire barrier layer (40) comprises at least one other elastomer, for example an elastomer making it possible to improve the implementation, the mechanical properties or the gas impermeability of the polychloroprene.

8. The anti-vibration device according to claim 1, wherein:
   the first frame (10) forms an inner frame;
   the second frame (20) forms an outer frame; and
   the vibration shock absorbing structure (30) assumes the form of a laminate with an elastomer layer (301)/layer of a non-elastomer material (302) more rigid than the elastomer, and including a first face (31) fixed to the inner frame (10), a second face (32) fixed to the outer frame (20), a third face (33) extending between the inner frame (10) and the outer frame (20), and a fourth face (34), opposite the third face (33) and also extending between the inner frame (10) and the outer frame (20), said third and fourth faces (33, 34) therefore being faces not fastened to the inner and outer frames; the fire barrier layer (40) also being situated on at least one (34) of the faces (33, 34) not connected to the inner (10) and outer (20) frames.

9. The anti-vibration device according to claim 8, wherein the non-elastomer material (302) is metal.

10. The anti-vibration device according to claim 1, wherein said at least one fire retardance agent is alumina trihydrate.

11. A railroad vehicle comprising an anti-vibration device according to claim 1.

12. The railroad vehicle according to claim 11, wherein the railroad vehicle comprises one of a train or a tram.

13. The railroad vehicle according to claim 12, wherein the train is a subway train.

\* \* \* \* \*

UNITED STATES PATENT AND TRADEMARK OFFICE
CERTIFICATE OF CORRECTION

PATENT NO. : 11,001,279 B2  
APPLICATION NO. : 15/461525  
DATED : May 11, 2021  
INVENTOR(S) : Yann Fromont et al.

It is certified that error appears in the above-identified patent and that said Letters Patent is hereby corrected as shown below:

On the Title Page

References Cited FOREIGN PATENT DOCUMENTS:
"DE 10 2013 01757 4/2015"
Should read:
"DE 10 2013 017571 4/2015"

In the Claims

Column 8, Line 24 Claim 1:
"thickness comprised between 05 mm and 3 cm, is a"
Should read:
"thickness comprised between 0.5 mm and 3 cm, is a"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*